(12) United States Patent
Bulan et al.

(10) Patent No.: US 6,699,455 B2
(45) Date of Patent: Mar. 2, 2004

(54) PROCESS FOR PREPARING HYDROGEN FLUORIDE IN A ROTARY TUBE FURNACE

(75) Inventors: Andreas Bulan, Langenfeld (DE); Klaus Esch, Leverkusen (DE); Peter Strabel, Essen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 415 days.

(21) Appl. No.: 09/891,930

(22) Filed: Jun. 26, 2001

(65) Prior Publication Data

US 2002/0001563 A1 Jan. 3, 2002

(30) Foreign Application Priority Data

Jun. 28, 2000 (DE) .......................................... 100 31 562

(51) Int. Cl.$^7$ ................................................. C01B 7/19
(52) U.S. Cl. ....................................... 423/485; 423/482
(58) Field of Search ................................. 423/482, 483, 423/485

(56) References Cited

U.S. PATENT DOCUMENTS

| | | | |
|---|---|---|---|
| 1,316,569 A | 9/1919 | Fickes | ............................. 23/1 |
| 1,665,588 A | 4/1928 | Harshaw et al. | |
| 1,748,735 A | 2/1930 | Scott | |
| 1,812,770 A | 6/1931 | Bishop | |
| 2,018,397 A | * 10/1935 | Calcott et al. | ............... 423/485 |
| 2,932,557 A | 4/1960 | List et al. | |
| 3,087,787 A | * 4/1963 | Flemmert | .................... 423/336 |
| 3,102,787 A | 9/1963 | McMillan et al. | ............. 23/153 |
| 3,300,279 A | * 1/1967 | Parisot | ........................ 423/485 |
| 3,574,557 A | * 4/1971 | Gentilli | ....................... 422/202 |
| 4,010,245 A | 3/1977 | Spreckelmeyer et al. | ... 423/485 |

FOREIGN PATENT DOCUMENTS

| | | | | |
|---|---|---|---|---|
| CH | 659646 | * | 2/1987 | ................. 423/485 |
| SU | 1530568 | * | 12/1989 | ................. 423/485 |
| SU | 1731724 | * | 5/1992 | ................. 423/485 |

* cited by examiner

Primary Examiner—Ngoc-Yen Nguyen
(74) Attorney, Agent, or Firm—Godfried R. Akorli; Diderico van Eyl

(57) ABSTRACT

The invention relates to a novel process for preparing hydrogen fluoride in a uniformly high conversion at a high space-time yield with minimal energy consumption by reaction of fluorspar with sulfuric acid in a rotary tube furnace, in which the furnace is divided into three equal-sized zones, each of which is heated indirectly by means of from 1 to 12 independent combustion chambers, there being a temperature gradient between the zones such that the first zone has the highest temperature and the third zone has the lowest temperature.

8 Claims, No Drawings

PROCESS FOR PREPARING HYDROGEN FLUORIDE IN A ROTARY TUBE FURNACE

BACKGROUND OF THE INVENTION

The invention relates to a novel process for preparing hydrogen fluoride in a rotary tube furnace.

It is known that hydrogen fluoride can be prepared by reaction of sulfuric acid with fluorspar, forming calcium sulfate as by-product. The reaction is endothermic, thus requiring the introduction of additional energy. Part of the energy is introduced via the starting materials, so that these have stored a maximum of latent heat. The remaining energy is introduced into the reactor by means of indirect heating. The reactor used is usually a rotary tube furnace. The solid fluorspar is mixed with liquid sulfuric acid, forming gaseous hydrogen fluoride and solid calcium sulfate. The reaction is problematical, since the reaction mixture goes through various paste-like phases. The paste-like phases stick to the reactor wall and greatly hinder the introduction of energy from the outside. A further problem is hindrance of mass transfer by the calcium sulfate which forms on the surface of the calcium fluoride. This hindrance of mass transfer leads to a high residence time and thus to a low space-time yield, which cannot be tolerated in an industrial reaction. The prior art therefore describes measures for avoiding or handling the paste-like phases and measures for avoiding the hindrance of mass transfer by the calcium sulfate being formed.

According to U.S. Pat. No. 1,812,770, fluorspar was reacted with sulfuric acid in a rotary tube furnace for the first time in 1931. For this purpose, the entire rotary tube was heated by a central combustion chamber. The technique of heating the rotary tube furnace by means of a central combustion chamber is still the usual practice today.

Attempts have been made to increase the space-time yields by means of mixing elements installed in the rotary tube (cf., for example, U.S. Pat. No. 1,316,569). Disadvantages of such internals are that the construction of the rotary tube is complicated and cleaning work is made considerably more difficult.

To avoid hindrance of mass transfer and the formation of encrustations on the reactor wall, iron balls (cf. U.S. Pat. No. 1,665,588) or rails from a railway (cf. U.S. Pat. No. 1,748,735) have been placed in the rotary tube. A disadvantage is that the material of the rotary tube is subjected not only to the existing chemical attack but also to extreme mechanical stress and the operating life is therefore reduced.

To improve the conversion and to allow better handling of the paste-like phase, U.S. Pat. No. 2,932,557 proposes the use of a mixer that improves mixing of fluospar and sulfuric acid. A disadvantage of such constructions is that a high temperature level cannot be achieved and the space-time yield remains low. In addition to the mixer, a rotary tube furnace continues to be required.

According to U.S. Pat. No. 3,102,787, the sulfuric acid is added to the fluorspar in the rotary tube furnace via a distributor system. This is said to avoid the paste-like phases. The encrustations on the reactor wall which are otherwise observed and the associated impairment of heat input into the reactor are said to be avoided. A disadvantage is the structurally complicated distributor system for sulfuric acid in the furnace. In the case of operational malfunctions, it can be destroyed by the reaction mixture falling from the reactor wall.

To improve energy input, the reaction can be carried out in a fluidized bed and part of the energy can be obtained by reaction of sulfur trioxide with water to form sulfuric acid (cf. U.S. Pat. No. 3,102,787). A disadvantage of fluidized-bed operation is that the hydrogen fluoride product gas must be separated off from the fluidizing gas. In addition, fine, fluospar-containing dust is carried from the fluidized bed.

To avoid the paste-like phase, the sulfuric acid can be reacted with fluorspar in additional reactor in such a way as to give a mixture which does not go through the paste-like phase in the rotary tube furnace (cf. DE 2 435 512 A1). However, this process requires an additional reactor.

All processes have the disadvantage that either high space-time yield cannot be achieved or, due to the formation of encrustations, an inhomogeneous solid product comprising calcium sulfate, calcium fluoride, and sulfuric acid leaves the rotary tube. Unreacted starting materials can be present in the reaction product in concentrations of up to 10% and mean that relatively expensive fluospar is lost. Likewise, the reaction product includes unreacted sulfuric acid which requires subsequent neutralization by means of a lime and thus an additional process step, thus incurring additional costs.

It is therefore an object of the invention to provide a process by means of which hydrogen fluoride can be prepared at a constant high conversion, in a high space-time yield and with minimal energy consumption.

It has been found that a uniform conversion at a high space-time yield and with minimal energy consumption can be achieved when the rotary tube furnace is heated zonewise by means of independent burners which can be controlled independently of one another.

SUMMARY OF THE INVENTION

The present invention provides a process for preparing hydrogen fluoride comprising reacting fluorspar with sulfuric acid in a rotary tube furnace that is divided in the longitudinal direction into three equal-sized zones, wherein (1) a first zone comprises the first third of the furnace and is fitted with an inlet opening for the starting materials, (2) a second zone comprises the middle section of the furnace, and (3) a third zone comprises the last third of the furnace and is fitted with an outlet opening for products, wherein each zone is heated indirectly using from 1 to 12 independent combustion chambers to provide a temperature gradient between the zones such that the first zone has the highest temperature and the third zone has the lowest temperature.

It is also possible to take the hydrogen fluoride that is formed not from the third zone but from the first zone of the furnace.

DETAILED DESCRIPTION OF THE INVENTION

The starting materials, namely sulfuric acid and fluorspar, can be preheated to a high temperature level. In such a case, the fluorspar can be heated to a temperature of, for example, from 350 to 450° C. by indirect heating. The sulfuric acid is conveyed in countercurrent to the hot hydrogen fluoride leaving the furnace and is in this way heated to generally from 80 to 180° C. The heated starting materials can then be mixed in a screw mixer and then go into the indirectly heated rotary tube furnace. The number of combustion chambers depends on the length of the rotary tube. Thus, a rotary tube having a length of 20 m and a diameter of 2.5 m can be heated indirectly by, for example, from 3 to 15 (preferably from 6 to 12) combustion chambers. The indirect heating is preferably carried out by means of burners.

There are preferably from 1 to 12 combustion chambers in the first zone of the furnace, from 1 to 10 combustion chambers in the second zone, and from 1 to 6 combustion chambers in the third zone.

The furnaces for heating the combustion chambers can be operated using, for example, natural gas or mineral oil as fuel. The air for combustion can be preheated, e.g., using the residual heat of the waste gases from heating of the furnace.

The endothermic reaction of fluorspar and sulfuric acid requires a certain quantity of energy. However, introduction of the quantity of energy required on the basis of the reaction equation is not sufficient for complete conversion. Depending on the efficiency of the plant, a greater quantity of energy has to be made available. The efficiency of the plant is determined, for example, by the energy content of the starting materials fed to the furnace, the quality of energy input from the hot flue gases from the combustion chambers or the radiated head from the combustion chambers via the furnace wall to the reaction mixture, and the mixing of the reaction mixture in the furnace. The efficiency of a plant can be determined only in operation. On this basis, it is possible to determine a quantity of energy which has to be introduced into the furnace in order to achieved complete conversion at a given supply of raw materials to the furnace. To minimize this quantity of energy, the temperature of the individual combustion chambers is preferably regulated so that a maximum quantity of energy can be introduced at the beginning of the furnace. A furnace wall temperature of from 300 to 600° C. (preferably from 350 to 450° C.) is set in the first zone by variation of the amount of fuel. A furnace wall temperature of 200 to 450° C. (preferably 250 to 350° C.) is set in the second zone and a furnace wall temperature of 150 to 350° C. (preferably 200 to 300° C.) is set in the third zone.

The temperature in the individual combustion chambers can be controlled manually or by means of an appropriate computer program. The total quantity of energy made available over all combustion chambers by means of the fuel depends on the amount of raw material with which the furnace is supplied. The quantity of fuel is made such that complete conversion can be achieved. The fluorspar content in the calcium sulfate is then less than 1% by weight and the sulfuric acid content is less than 1.5% by weight. Use of the process of the invention enabled the furnace capacity to be increased by over 30% or the energy input to be reduced at the same capacity. The formation of encrustations on the furnace wall is avoided.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Example 1
Prior Art, Standard Operation of the Furnace 60 kg/min of fluospar and 81.9 kg/min of sulfuric acid (calculated as 100% strength sulfuric acid) were fed into a rotary tube furnace. The fluorspar had a temperature of about 400° C., and the sulfuric acid had a temperature of about 120° C. Part of the sulfuric acid (⅓ of the total amount) was introduced directly into the furnace, while the other part (⅔ of the total amount) was mixed briefly with the fluorspar. The furnace had a length of 20 m and a diameter of 2.5 m and was heated uniformly. The front part of the furnace had to be cleaned at irregular intervals, since growing encrustations slowly closed the rotary tube. 158 m³/h of natural gas were used for the reaction. The calcium sulfate product contained from 2 to 5% of fluorspar and from 2 to 5% of sulfuric acid. The concentration of fluorspar and sulfuric acid in the calcium sulfate product were not constant and fluctuated. The temperature of the hydrogen fluoride gas at the outlet from the furnace was 214° C., while that of the solid reaction products was 197° C.

Example 2
Prior Art, Use of Higher Quantities of Energy

The rotary tube furnace was operated as in Example 1, but the quantity of natural gas was increased to 168 m³/h. No lowering of the fluorspar and sulfuric acid concentrations in the reaction product could be achieved. The additional energy input resulted in the temperature of the hydrogen fluoride leaving the rotary tube furnace being 20° C. higher and that of the solid reaction product being 10° C. higher.

Example 3
Process of the Invention 60 kg/min of fluospar and 81.9 kg/min of sulfuric acid (calculated as 100% strength sulfuric acid) were fed into a rotary tube furnace. The fluorspar had a temperature of about 400° C., and the sulfuric acid had a temperature of about 120° C. Part of the sulfuric acid (⅓ of the total amount) was introduced directly into the furnace, while the other part (⅔ of the total amount) was mixed briefly with the fluorspar. The furnace had a length of 20 m and a diameter of 2.5 m. The furnace was divided into three zones having three combustion chambers each, with the combustion chambers being numbered successively from 1 to 9. The furnace wall temperature in the first zone of the furnace at the first and second combustion chambers was about 350° C. and then dropped linearly to about 220° C. at the last combustion chamber. The furnace wall temperature was controlled by regulating the quantity of natural gas supplied to the nine burners present in the combustion chambers; the total quantity of natural gas did not exceed 138 m³/h. The fluorspar content of the reaction product was from 0.5 to 1.1% by weight, and the sulfuric acid content was from 0.5 to 1.7% by weight. The temperature of the hydrogen fluoride gas at the outlet from the furnace was 215° C. and the temperature of the solid reaction product was 214° C.

Example 4
Process of the Invention 80 kg/min of fluorspar and 109 kg/min of sulfuric acid (calculated as 100% strength sulfuric acid) were fed into a rotary tube furnace. The fluorspar had a temperature of about 400° C., and the sulfuric acid had a temperature of about 120° C. Part of the sulfuric acid (⅓ of the total amount) was introduced directly into the furnace, while the other part (⅔ of the total amount) was mixed briefly with the fluorspar. The furnace had a length of 20 m and a diameter of 2.5 m. The furnace was divided into three zones having three combustion chambers each, with the combustion chambers being numbered successively from 1 to 9. The furnace wall temperature in the first zone of the furnace at the first and second combustion chambers was about 370° C. and then dropped linearly to about 210° C. at the last combustion chamber. The furnace wall temperature was controlled by regulating the quantity of natural gas supplied to the nine burners present in the combustion chambers; the total quantity of natural gas did not exceed 189 m³/h. The fluorspar content of the reaction product was from 0.5 to 1.1% by weight, and the sulfuric acid content was from 0.5 to 1.7% by weight. The temperature of the hydrogen fluoride gas at the outlet from the furnace was 205° C. and the temperature of the solid reaction product was 204° C.

What is claimed is:

1. A process for preparing hydrogen fluoride comprising reacting fluorspar with sulfuric acid in a rotary tube furnace that is divided in the longitudinal direction into three equal-sized zones, wherein (1) a first zone comprises the first third of the furnace and is fitted with an inlet opening for the starting materials, (2) a second zone comprises the middle section of the furnace, and (3) a third zone comprises the last third of the furnace and is fitted with an outlet opening for products, wherein each zone is heated indirectly using from 1 to 12 independent combustion chambers to provide a temperature gradient between the zones such that the first zone has the highest temperature and the third zone has the lowest temperature.

2. A process according to claim 1 wherein the first zone has 1 to 12 combustion chambers, the second zone has 1 to 10 combustion chambers and the third zone has 1 to 6 combustion chambers, each of which is heated by burners.

3. A process according to claim 1 wherein the first zone has a temperature of from 300 to 600° C., the second zone has a temperature of from 200 to 450° C., and the third zone has a temperature of from 150 to 350° C., each temperature being measured at the furnace wall.

4. A process according to claim 1 wherein the furnace wall temperature of the individual zones is controlled manually or using a computer program by altering the quantity of fuel supplied to the individual combustion chambers.

5. A process according to claim 1 wherein the fluorspar is heated to a temperature of from 350 to 450° C. and the sulfuric acid is heated to a temperature of from 80 to 180° C. and the heated fluorspar and sulfuric acid are mixed in a screw mixer and subsequently fed into the rotary tube furnace.

6. A process according to claim 1 wherein 2 to 100% of the sulfuric acid is introduced directly into zone 1 of the furnace.

7. A process according to claim 1 wherein 30 to 60% of the sulfuric acid is introduced directly into zone 1 of the furnace.

8. A process according to claim 1 wherein the combustion chambers are heated by burners using natural gas or mineral oil.

* * * * *